United States Patent [19]

Jones

[11] Patent Number: 4,996,753
[45] Date of Patent: Mar. 5, 1991

[54] ROBOT END EFFECTOR EXCHANGE SYSTEM

[75] Inventor: Everett E. Jones, Wichita, Kans.

[73] Assignee: The Boeing Company, Seattle, Wash.

[21] Appl. No.: 251,241

[22] Filed: Sep. 30, 1988

[51] Int. Cl.$^5$ .................... B23Q 3/155; B25J 15/04
[52] U.S. Cl. .................... 29/26 A; 29/568; 414/730; 901/41
[58] Field of Search ............ 29/568, 26 A; 279/1 TS; 901/41, 31, 30, 39; 414/730, 729, 739; 294/86.4, 103.1

[56] References Cited

U.S. PATENT DOCUMENTS

| | | | |
|---|---|---|---|
| 4,012,818 | 3/1977 | Dornblüth et al. | 29/26 A |
| 4,046,263 | 9/1977 | Cwycyshyn et al. | 29/26 A X |
| 4,274,192 | 6/1981 | Norimatsu | 29/568 |
| 4,281,447 | 8/1981 | Miller et al. | 29/568 |
| 4,486,928 | 12/1984 | Tucker et al. | 29/26 A |
| 4,488,241 | 12/1984 | Hutchins et al. | 279/1 TS X |
| 4,512,709 | 4/1985 | Hennekes et al. | 901/41 |
| 4,520,550 | 6/1985 | Dunn et al. | 29/568 |
| 4,543,032 | 9/1985 | Levereti et al. | 414/730 |
| 4,601,637 | 7/1986 | Aviles et al. | 414/739 |
| 4,604,787 | 8/1986 | Silvers | 29/568 |
| 4,660,274 | 4/1987 | Goumas et al. | 29/568 |
| 4,664,588 | 5/1987 | Newell et al. | 901/41 X |
| 4,676,142 | 6/1987 | McCormick et al. | 901/30 X |

FOREIGN PATENT DOCUMENTS

| | | | |
|---|---|---|---|
| 3514167 | 10/1986 | European Pat. Off. | 901/41 |
| 1132160 | 3/1957 | France | 403/5 |
| 2578775 | 9/1986 | France | 901/41 |
| 39146 | 2/1987 | Japan | 29/568 |

*Primary Examiner*—William Briggs
*Attorney, Agent, or Firm*—Finnegan, Henderson, Farabow, Garrett & Dunner

[57] ABSTRACT

A robot end effector exchange system comprises a movable robot arm and an end effector. Connecting structure on each of the arm and end effector are operable for releasably attaching the arm and end effector in an operative relationship. A fixture supportably receives the end effector attached to the robot arm and includes restraining structure operable for holding the end effector on the fixture to permit attachment and detachment of the end effector and the arm. Hydraulic actuators on the fixture selectively operate the connecting structure and the restraining structure.

18 Claims, 6 Drawing Sheets

ROBOT END EFFECTOR EXCHANGE SYSTEM

BACKGROUND OF THE INVENTION

1. Field of the Invention

The present invention relates to robotic devices, and more particularly to the interchange of robot end effectors utilized with a robot arm.

2. Description of Related Art

A robot system typically includes a robot arm attached to a robot base, the end of the arm having an end-effector attached to a gripper or some other tool. In a conventional robot system, the robot arm is remotely controlled, often automatically by a predetermined program. The performance of certain tasks by an industrial robot may require sequential use by the robot of a plurality of different tools or grippers to accomplish a wide range of actions involving the manipulation of workpieces in a manufacturing setting. For efficient use of the robot, it is important to provide for automatic interchange of desired tools or grippers selected from an array of tools and grippers. Such interchange should be performed rapidly, and without the need for human intervention.

Prior art systems suffer from the shortcoming that the end effector assemblies, although removably attached to the robot arm, require a separate control unit and corresponding umbilicals (e.g., electrical and/or pneumatic conductors) distinct from that of the robot arm, resulting in a cumbersome duplication of control input conduits. Related disadvantages of such systems include inefficient interchange of end effectors, limited mobility of robot arms, and the need for human intervention to attach the end effector to its control unit.

The present invention provides a robot end effector exchange system which permits the rapid and automatic attachment and detachment of a robot arm from an end effector.

The robot end effector exchange system permits use of a plurality of different end effectors during the working cycle of a given workpiece.

Advantageously, in the robot end effector exchange system, energy may be readily and reliably transmitted to activate the gripper or tool mechanism of the end effector without the need for duplicate control umbilicals between the robot arm and the end effector.

The robot end effector exchange system also permits attachment and detachment of the end effector as a result of simple linear motion of the robot arm.

SUMMARY OF THE INVENTION

In accordance with the invention as embodied and as broadly described herein, a robot end effector exchange system is provided comprising a movable robot arm and end effector including a body and a tool mechanism carried by the body. The robot arm and end effector each include means for connecting one to the other, the connecting means operable to a first condition for permitting the detachment of the robot arm from the end effector and operable to a second condition for attaching the end effector to the robot arm. A fixture supportably receives the end effector in a predetermined orientation at times when the end effector is attached to the robot arm, the fixture including restraining means operable to a first condition for holding the end effector in the predetermined orientation on the fixture at times when the connecting means is operable to either the first or second condition and operable to a second condition for permitting the removal by the arm of the end effector from the fixture. Actuation means on the fixture selectively operate the connecting means and the restraining means to the first and second conditions.

Additional advantages of the invention will be set forth in the description which follows and in part will be obvious from the description, or may be learned by practice of the invention. The advantages of the invention may be realized and obtained by means of the instrumentalities and combinations particularly pointed out in the appended claims.

The accompanying drawings which are incorporated in and constitute a part of the specification illustrate a preferred embodiment of the invention and, together with the summary description given above and the detailed description of the preferred embodiment, including the appended claims given below, serve to explain the principles of the invention.

DETAILED DESCRIPTION OF THE PREFERRED EMBODIMENT

Reference will now be made in detail to the present preferred embodiment as illustrated in the accompanying drawings wherein like reference numerals refer to like parts.

A preferred embodiment of the robot gripper exchange system is shown in FIG. 1-9 and is represented generally by the numeral 10.

Figure 1:
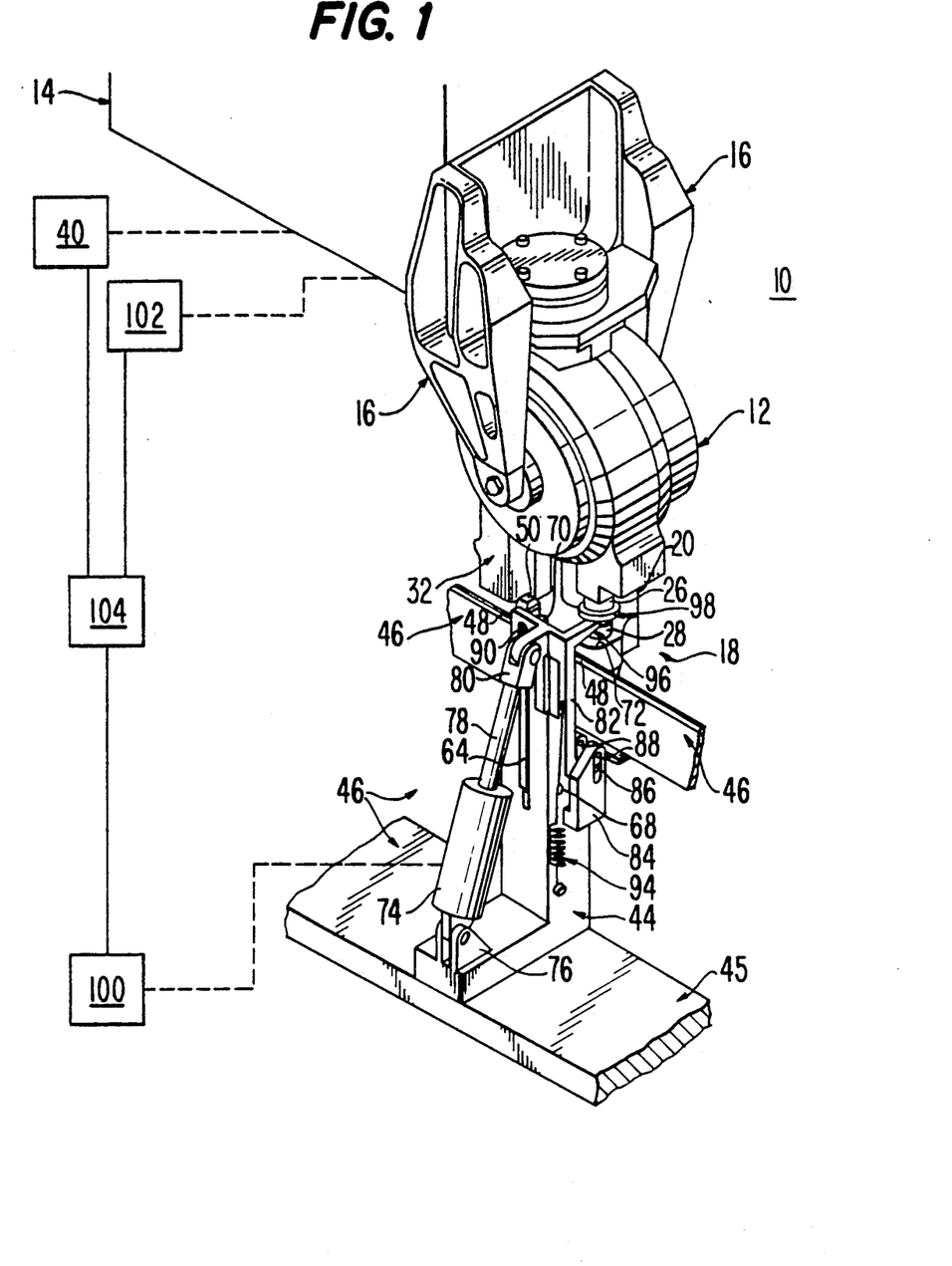
FIG. 1 is a view in perspective, and partially schematic, showing a robot end effector exchange system which constitutes a preferred embodiment of the invention, with the end effector shown attached to the robot arm and supported by the fixture.
Figure 2:
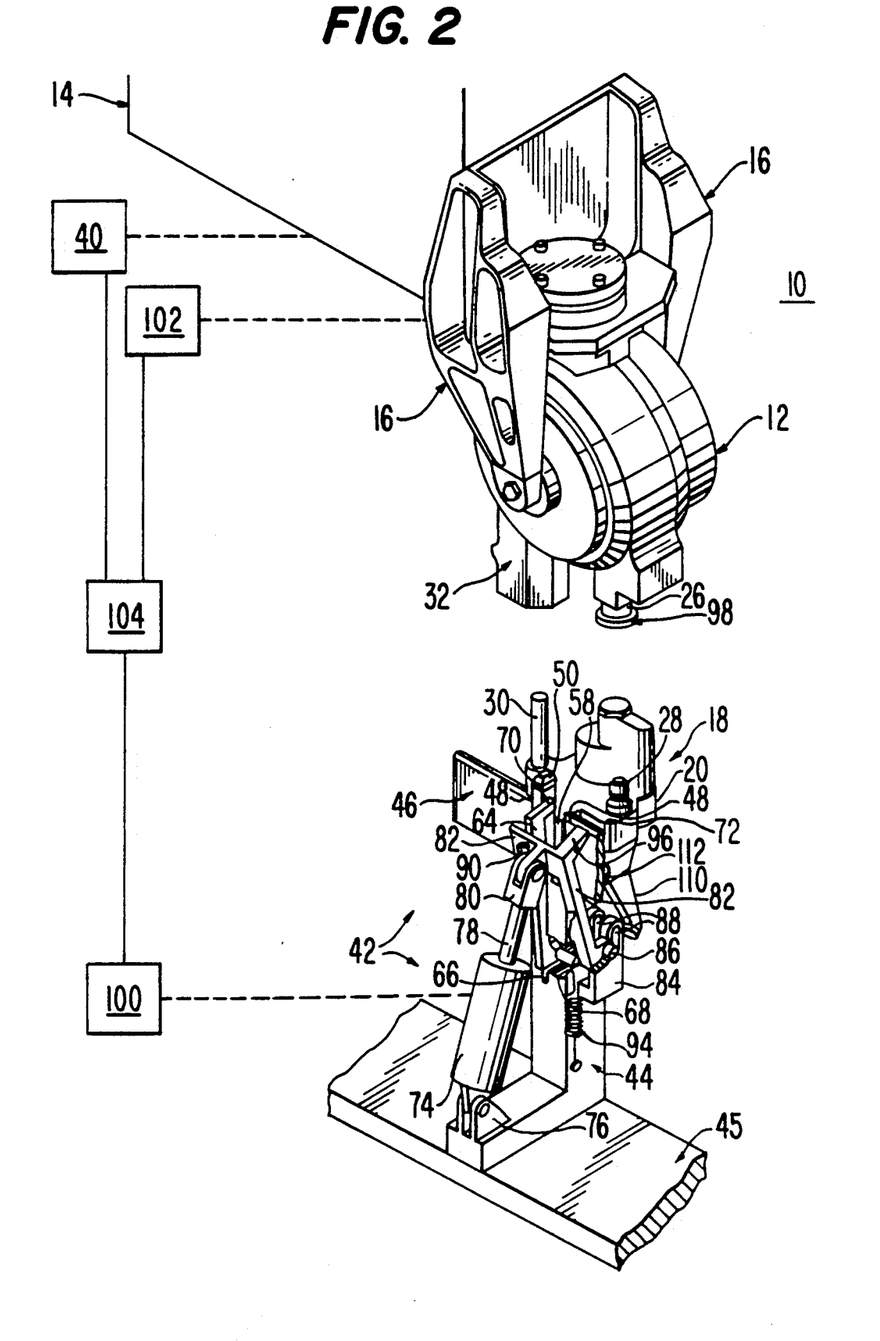
FIG. 2 is a view in perspective, and partially schematic with portions of the fixture shown cutaway, of the system of FIG. 1, with the robot arm shown detached from the robot end effector and the end effector shown supported by the fixture.
Figure 3:
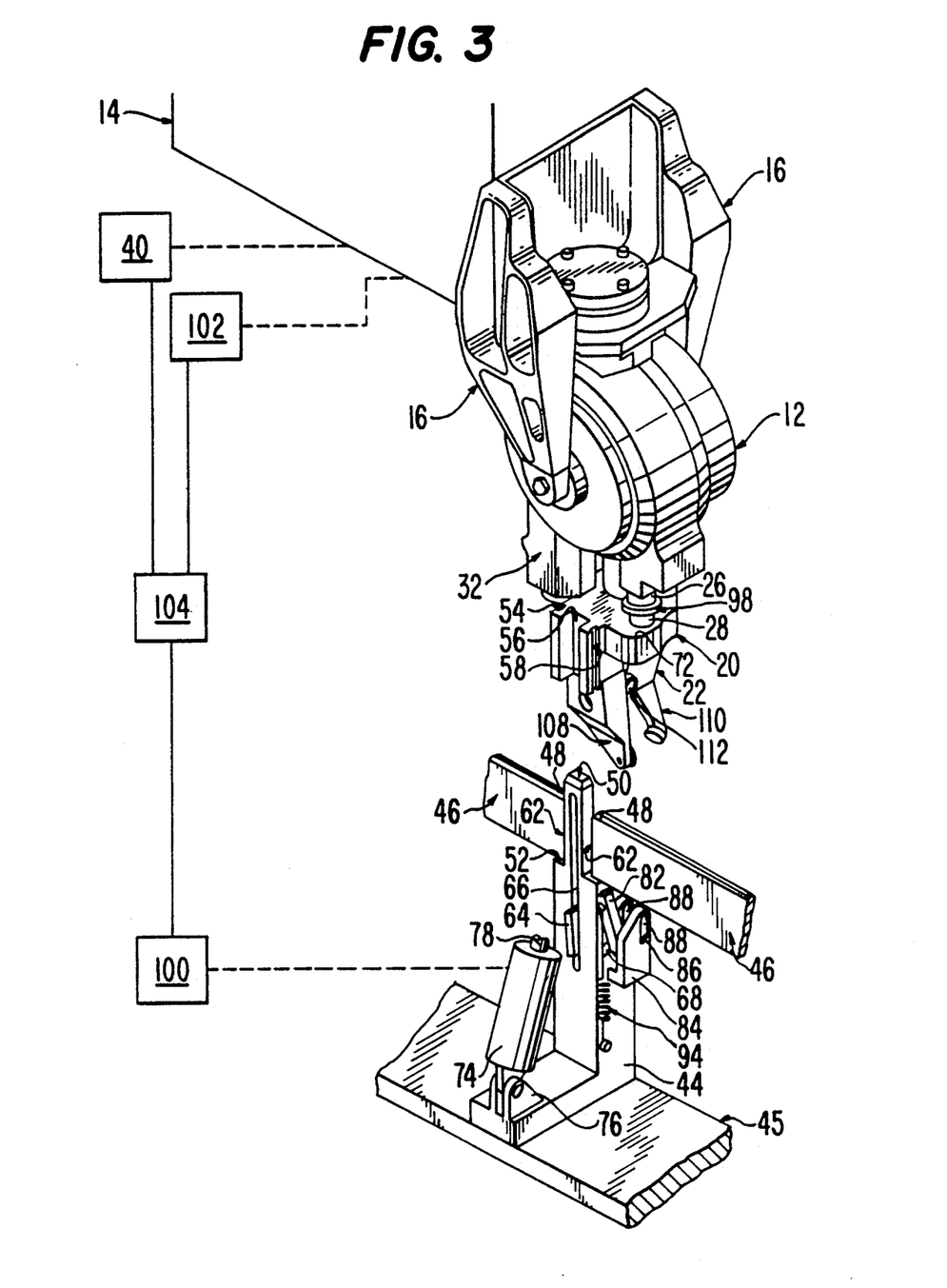
FIG. 3 is a view in perspective, and partially schematic with portions of the fixture shown cutaway, of the system of FIGS. 1 and 2, with the end effector shown attached to the robot arm and removed from the fixture.

In accordance with the invention, and as best shown in FIGS. 1-3, system 10 comprises a movable robot arm and an end effector including a body and a tool mechanism carried by the body. As embodied herein, a robot arm 12 is mounted to a base 14 by a bracket 16. An end effector, best illustrated in FIGS. 5-7 and generally referred to by the numeral 18, includes a body 20 and a tool mechanism 22 carried by the body. As will be described further below, during operation of system 10 the end effector 18 may either be attached to arm 12, as shown in FIGS. 1 and 3, or detached from arm 12 as shown in FIG. 2. End effector 18 comprises hydraulic means, generally referred to by the numeral 24 (FIG. 5) and further described below, for utilizing hydraulic fluid to operate the tool mechanism 22 to grasp or release a workpiece (not shown).

The invention includes connecting means operable to a first condition for permitting the detachment of the robot arm from the end effector, and operable to a second condition for attaching the end effector to the robot arm. As embodied herein, the connecting means comprises a socket member 26 extending from arm 12 and a nipple member 28 extending from body 20 of end effector 18 (FIG. 2). Socket and nipple members 26, 28 are preferably of a conventional quick-coupling design which permits the members to be coupled together substantially by axial compression alone. As will be explained further below, socket member 26 is operable to the first condition preparatory to engaging the nipple member 28 to form a fluid tight coupling between arm 12 and tool mechanism 2 (FIG. 1) when end effector 18 is attached to arm 12. Socket member 26 is operable to a second condition preparatory to disengaging from the nipple member 28 for permitting the detachment of arm 12 from end effector 18 (FIG. 2). Preferably, nipple member 28 is designed to prevent leakage of hydraulic fluid from the tool mechanism 22 when disengaged from socket member 26. A conventional sealing valve (not shown) may be used for this purpose.

As best shown in FIG. 2, the connecting means of the preferred embodiment further comprises a pin 30 extending from end effector body 20 and spaced from nipple member 28. A seizing mechanism generally referred to by the numeral 32 extends from arm 12 and is spaced from socket member 26. Seizing mechanism 32 is operative for seizing pin 30 to fixedly attach end effector 18 to arm 12 and for releasing pin 30 to detach the arm from the end effector.

Figure 8:
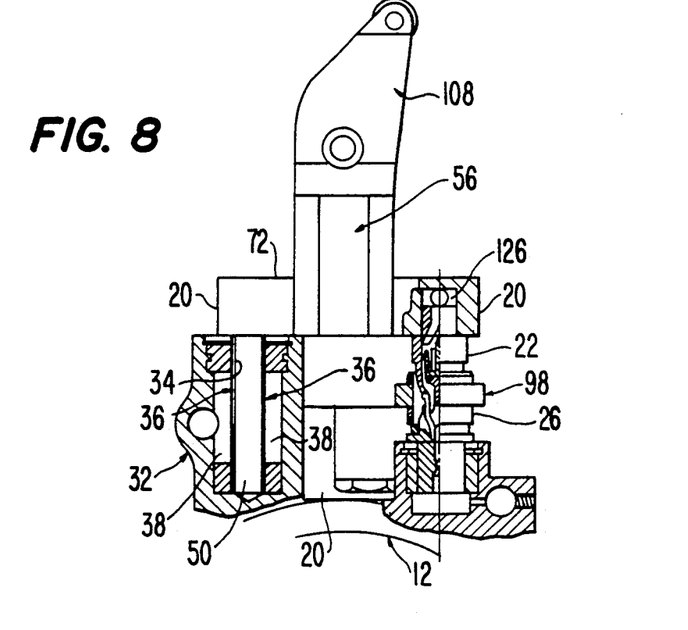
FIG. 8 is a cross-section in partial cutaway of the attached robot end effector and robot arm of the system of FIGS. 1-4.
Figure 9:
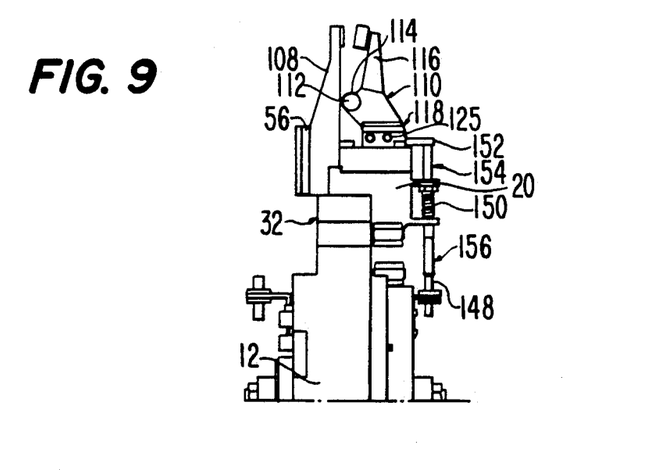
FIG. 9 is a side view of the attached robot end effector and arm of FIG. 8.

As best shown in FIG. 8, seizing mechanism 32 includes a cavity 34 for slideably receiving pin 30, a flexible sleeve 36 for surrounding the pin and a plenum 38 surrounding the sleeve for containing fluid. Hydraulic means, such as a hydraulic system 40 represented schematically in FIGS. 1-3 and connected through arm 12 to seizing mechanism 32, are provided for transmitting hydraulic fluid under pressure to plenum 38 to urge sleeve 36 into seizing engagement with pin 30 to attach end effector 18 to arm 12. As detailed further below, hydraulic system 40 may be controlled to release the pressure of the hydraulic fluid in plenum 38 to release the pin 30 to detach the end effector 18 from arm 12. Hydraulic system 40 may be of conventional design.

The connecting means of the preferred embodiment is operable for seizing pin 30 in seizing mechanism 32 and engaging nipple member 28 with socket member 26 for attaching the end effector 18 to the arm 12 in an operative relationship and for detaching the arm 12 from the end effector 18 by releasing the pin 30 and disengaging from the nipple member 28.

Figure 4:
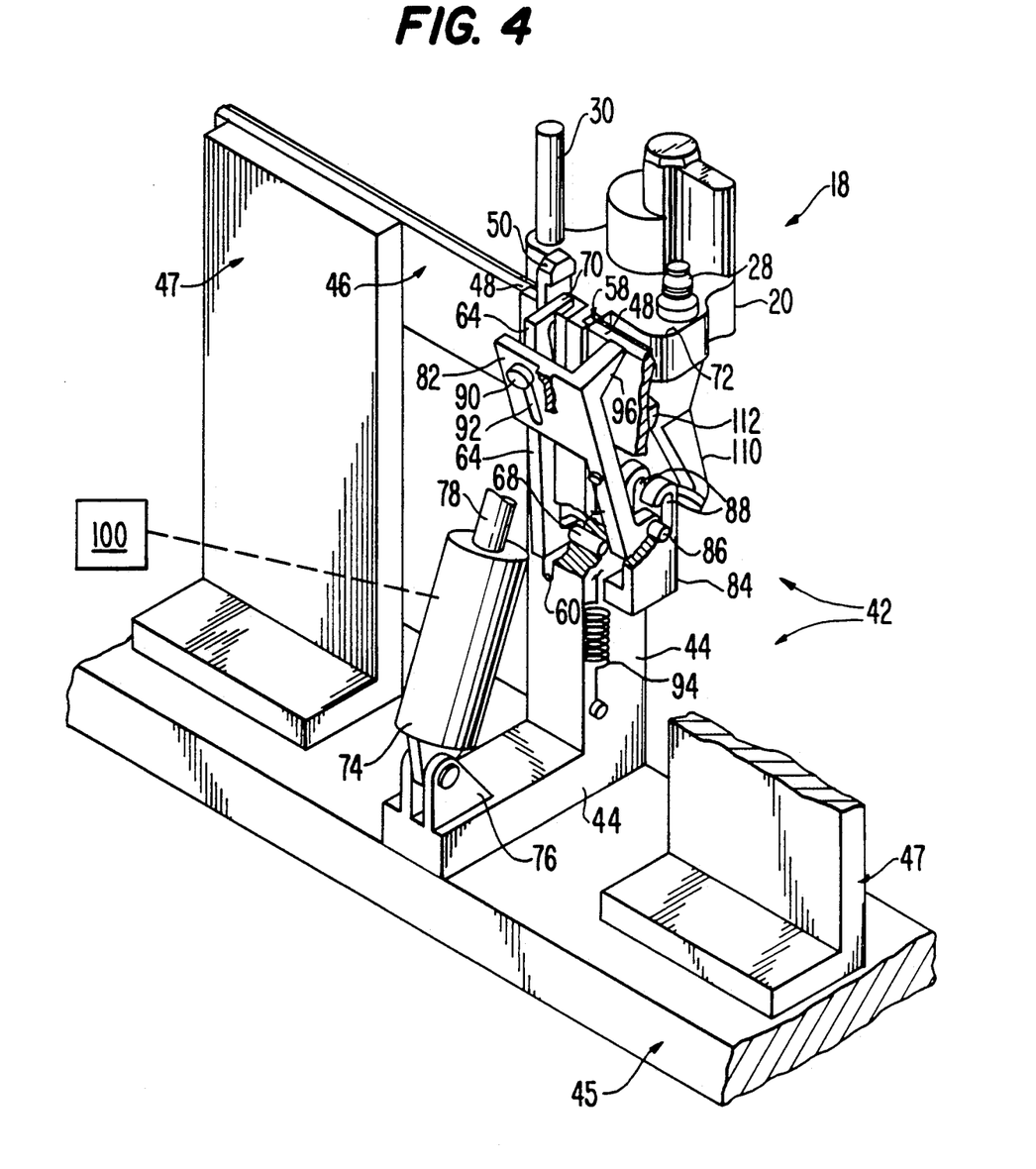
FIG. 4 is a view in perspective, and partially schematic with portions of the fixture shown cutaway, of the fixture of the system of FIGS. 1, 2 and 3, with an end effector shown in the supported position.
Figure 7:
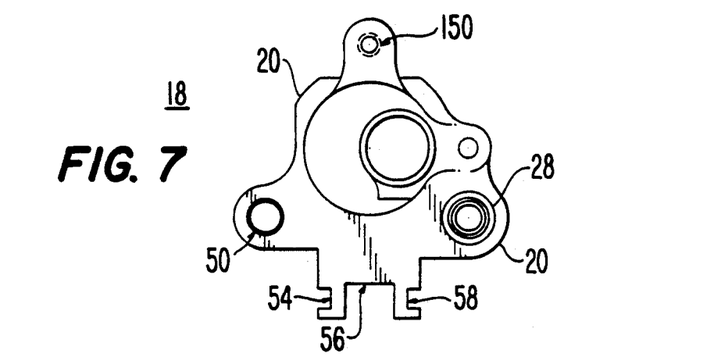
FIG. 7 is an aft view of the robot end effector of FIG. 5.

The invention includes a fixture for supportably receiving the end effector in a predetermined orientation at times when the end effector is attached to the robot arm. As best shown in FIG. 4, the fixture of the preferred embodiment is generally referred to by the numeral 42 and comprises frame 44 fixed to a base plate 45 to maintain the fixture in a stationary position. Several fixtures 42 may be spacedly connected to one another by means of a spacer member such as bars 46 fastened to base plate 45 by a bracket 47. As best shown by the cutaway view of FIG. 3, the ends 48 of bars 46 rest on frame 44, and are spaced from a portion 50 of frame 44 extending vertically from shoulders 52 to form spaces or slots 60, 62. Body 20 of end effector 18 has spaced vertically extending grooves 54, 56 and 58, which are configured for slideably mating with the portion 50, ends 48 and slots 60, 62 at times when the robot arm 12 is manipulated to deposit the end effector 18 on fixture 42 (FIGS. 3 and 7). Grooves 54, 58 mate with spaces 60, 62, and groove 56 mates with portion 50 to support end effector 18 on fixture 42 in the correct orientation (FIG. 4), thus facilitating quick attachment and detachment of arm 12 and end effector 18.

The fixture of the present invention includes restraining means operable to a first condition for holding the end effector in the predetermined orientation on the fixture at times when the connecting means is operated to either the first or second condition and operable to a second condition for permitting the removal by the arm of the end effector from the fixture. As embodied herein and best shown in FIG. 4, the restraining means comprises a holding member 64 pivotably mounted on the frame 44. Preferably, a vertical slot or opening 66 (FIG. 3) is provided in portion 50 of frame 44 for accommodating holding member 64 fastened by pin 68 passing through the slot 66 in frame 44. With this arrangement, a dog portion 70 of holding member 64 will overlap surface 72 of end effector body 20, at a point substantially between nipple member 28 and pin 30, to hold end effector 18 in the predetermined orientation on fixture 42.

When end effector 18 is held stationary on fixture 42 by holding member 64, the robot arm 12 may be separated from the detached end effector 18 without manual intervention. When holding member 64 is pivoted to a position out of engagement with surface 72, end effector 18 may be removed by arm 12 from fixture 42.

The fixture of the present invention further includes actuation means for selectively operating the connecting means and the restraining means to the first and second conditions. As embodied herein, as best shown in FIG. 2, the actuation means comprises a hydraulic cylinder 74 attached to clevis 76 extending from frame 44 and having a rod 78 with a clevis portion 80 attached to lever 82. Lever 82 is pivotably mounted to the frame 44. Preferably, lever 82 is mounted on a bracket portion 84 attached to frame 44 by a pin 86 passing through the end of lever 82 and occupying vertical slots 88. A conventional hydraulic system, represented schematically by the numeral 100, may be used to actuate hydraulic cylinder 74.

Holding member 64 and lever 82 are preferably attached by a screw or fastener 90 extending from member 64 and passing through slot 92 of lever 82, as best shown in FIG. 4, to permit relative movement between holding member 64 and lever 82 as they are pivoted relative to frame 44 in the manner described below.

In operating the actuation means of system 10, hydraulic cylinder 74 is operated either to extend rod 78 to an outer position (FIG. 1) or to retract rod 78 to an inner position (FIG. 2). As rod 78 is extended from the inner position to the outer position, lever 82 and holding member 64 are pivoted with screw 90 of member 64 sliding downwardly in the slot 92. Dog portion 70 of pivoted member 64 engages and overlaps surface 72 to secure the end effector 18 in position on the fixture. Preferably, a coil spring 94 is attached between lever 82 and frame 44 for applying sufficient tension on lever 82, at times when holding member 64 is pivoted in and out of engagement with end effector 18, to urge pin 86 against the lower end of slot 88 as shown in FIGS. 2 and 4. With further extension of rod 78 to the outer position (FIG. 1), lever 82 is pushed vertically upward in the direction of arm 12 and pin 86 slides upward in slots 88, to permit a dog portion 96 of lever 82 to engage a collar 98 of socket member 26. Dog portion 96 of lever 82 is in the vicinity of its position shown in FIG. 1 preparatory to either attachment or detachment of arm 12 and end effector 18. It will be recognized that the range of vertical motion of lever 82, as defined by the length of slot 86, is preferably selected to correspond to the geometric characteristics of socket member 26 and nipple member 28 for coupling and uncoupling.

If it is desired to detach arm 12 from end effector 18, for example, with the end effector in position on fixture 42 as shown in FIG. 1, hydraulic system 40 is operated to cause seizing mechanism 32 to release pin 30 and hydraulic cylinder 74 is operated to pivot holding member 64 so that dog 70 engages surface 72 of end effector 18 and dog 96 engages collar 98 of socket member 26. Cylinder 74 is further operated to manipulate lever 82 to cause dog 96 to urge socket member 26 for disengaging from the nipple member 28, thereby permitting the robot arm 12 to be separated from end effector 18 as shown in FIG. 2.

If it is desired to attach the arm 12 to an end effector 18 positioned on the fixture 42, the hydraulic cylinder 74 is operated to pivot member 64 so that dog 70 laps over the surface 72 and dog 96 establish contact with collar 98 simultaneously with the lowering of arm 12 toward fixture 44. Ultimately as the arm is lowered, socket member 26 receives nipple member 28, and in coordination with further lowering of arm 12 hydraulic cylinder 74 is operated to cause dog 96 to operate the socket member 26 for engaging the socket member 26 with nipple member 28 to form a fluid coupling. Simultaneously with the coupling of socket member 26 and nipple member 28, seizing mechanism 32 receives pin 30. When pin 30 is fully inserted in seizing mechanism 32, hydraulic system 40 is operated to cause the seizing mechanism 32 to seize the pin 30 as explained above to fixedly attach end effector 18 to arm 12. When arm 12 and end effector are attached, hydraulic cylinder 74 is operated to retract rod 78 to the inner position, pivoting holding member 64 and lever 82 out of engagement with end effector 18 and away from fixture 44. End effector 18 may now be removed from fixture 44 by manipulating arm 12.

The invention includes control means for controlling the hydraulic means of the arm to release the pin and operating the connecting means and the restraining means to their respective first and second conditions. In the preferred embodiment, the control means is generally referred to by the numeral 104 as shown schematically in FIGS. 1-3 and comprises a slave computer and a master computer as described more completely in U.S. patent application Ser. No. 226,552, filed July 29, 1988 by Jones, et al. and assigned to the assignee of the present application. The disclosure of the aforementioned U.S. patent application is hereby expressly incorporated by reference.

Figure 5:
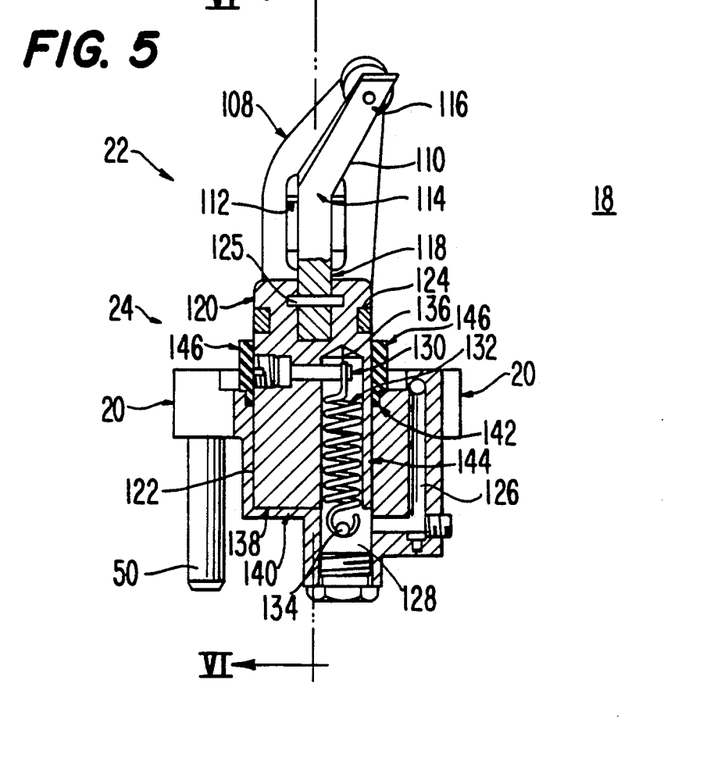
FIG. 5 is a cross-section in partial cutaway of the robot end effector of the system of FIGS. 1-4.
Figure 6:
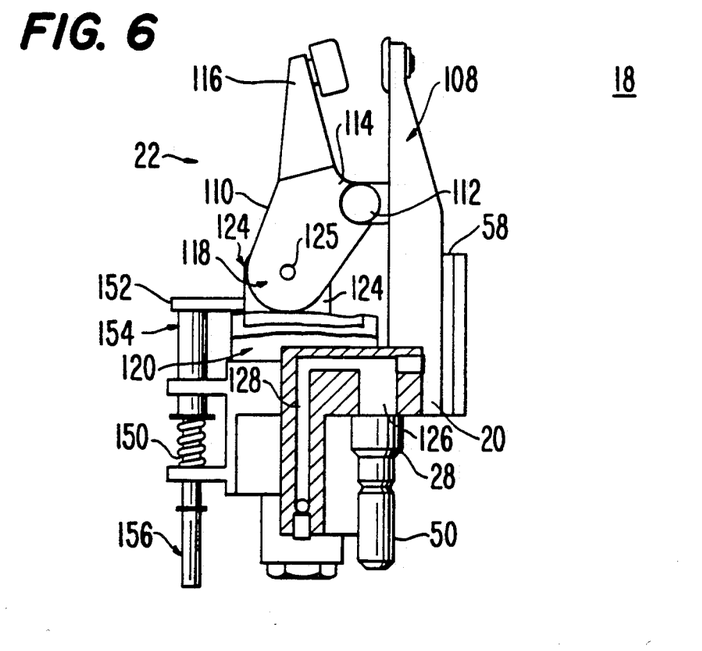
FIG. 6 is a cross-section in partial cutaway taken along line VI-VI of the robot end effector of FIG. 5.

FIGS. 5-9, illustrate the preferred embodiment of the tool mechanism of the present invention. As embodied herein, tool mechanism 22 is carried by the body 20 of end effector 18 and is operable as a gripper mechanism. Tool mechanism 22 comprises a stationary arm 108 mounted on body 20, and a movable arm 110 disposed generally opposite and pivotably fastened to arm 108 by a pin 112 at a point 114 intermediate a first end 116 and a second end 118 of movable arm 110. Second end 118 is pivotably fastened to a reciprocating piston 120 housed within a cylinder 122 in body 20, as best shown in FIGS. 5 and 6. A clevis portion 124 of piston 120 is formed by opposed flanges which straddle second end 118 and carry pin 125 (FIGS. 5 and 6). As detailed further below, piston 120 is responsive to fluid pressure to move reciprocally within cylinder 122, and urge second end 118 to pivot first end 116 closer to stationary arm 108 for grasping a workpiece therebetween.

Hydraulic fluid for operating hydraulic means 24 may be applied from a conventional hydraulic system connected to arm 12 and shown schematically as element 102. When socket member 26 and nipple member 28 are coupled, hydraulic fluid flows into end effector 18 via a path or conduit 126, as best shown in FIG. 5. Piston 120 is provided with a cavity 128 into which pin 130 embedded in piston 120 adjacent arm 110 extends. Spring 132 disposed in cavity 128 is fastened between pin 130 and pin 134. Fluid flowing in conduit 126 fills cavity 128 and pressure forces are exerted on an actuation surface 136 at the end of the cavity.

To grasp a workpiece, piston 120 is set into motion within cylinder 122 by the application of force to actuation surface 136. The movement of the piston 120 pivots arm 110 in the direction of arm 108. As the piston 120 slides out of cylinder 122 to further pivot arm 110, a clearance develops between the back surface 138 of the piston and surface 140 of the end effector body 20, permitting additional fluid pressure forces to expel piston 120 from cylinder 122 to further urge arms 108, 110 into the gripping position. The gripping action of tool mechanism 22 causes spring 132 to stretch into an extended state.

To release a workpiece, fluid pressure in cylinder 122 is relieved to system 102, and piston 120 is retracted by the recoil action of spring 132 in cavity 128 (FIG. 5) pulling piston 120 and pivoting movable arm 110 away from stationary arm 108 for releasing a workpiece.

Preferably, a seal 142 embedded in wall 144 of cylinder 122 is restrained in position by keeper 146 to maintain hydraulic fluid within cylinder 122.

Preferably, end effector 18 is provided with an indicator mechanism for use with arm 12 to indicate to an operator whether the end effector is attached to or detached from the robot arm 12 and, if attached, whether the tool mechanism 22 is operated to grasp or release the workpiece. As illustrated herein in FIG. 9, contact sensor 148 which may be a pressure sensitive sensor is provided on arm 12, and a retractable plunger device 150 is provided on body 20 between sensor 148 and flange 152 mounted on piston 120 and protruding therefrom adjacent clevis 124. One end 156 of plunger device 150 contacts sensor 148 to provide an indication to the operator of the attachment of arm 12 and end effector 18. At times when end 156 of plunger device 150 and sensor 148 are not in contact, an indication that the end effector and arm are detached is provided to the operator. Flange 152 is movable with piston 120 when tool mechanism 22 is operated. When the arm 12 and end effector 18 are attached, one end 154 of plunger device 150 contacts flange 152 when tool mechanism 22 is operated to release the workpiece and is separated therefrom when tool mechanism 22 is operated to grasp the workpiece, thus providing a corresponding indication to the operator of the operative state of mechanism 22.

It will be apparent to those skilled in the art that various modifications, variations, and additions can be made in the present invention without departing from the spirit or scope of the present invention. Thus, it is intended that the present invention cover the modifications and variations provided they come within the general scope of the claims and their equivalents.

What is claimed is:

1. A robot end effector exchange system, comprising:
    a movable robot arm;
    an end effector including a body and a tool mechanism carried by the body;
    the robot arm and end effector each including means for connecting one to the other, the connecting means operable to a first condition for permitting the detachment of the robot arm from the end effector, and operable to a second condition for attaching the end effector to the robot arm;
    a fixture for supportably receiving the end effector in a predetermined orientation at times when the end effector is attached to the robot arm, the fixture including restraining means operable to a first condition for holding the end effector in the predetermined orientation on the fixture at times when the connecting means is operated to either the first or second condition and operable to a second condition for permitting the removal by the arm of the end effector from the fixture; and
    actuation means on the fixture for selectively operating the connecting means and the restraining means to the first and second conditions.

2. The system of claim 1, wherein the end effector comprises hydraulic means responsive to fluid pressure for operating the tool mechanism and the connecting means comprises a socket member and a nipple member, each being on one of the arm and end effector, the socket member being operable to the first condition to engage the nipple member to form a fluid tight coupling between the arm and the tool mechanism and for permitting the removal by the arm of the end effector from the fixture and operable to the second condition to disengage from the nipple member for permitting the detachment of the robot arm from the end effector.

3. The system of claim 2, wherein the socket member extends from the arm and the nipple member extends from the body of the end effector.

4. The system of claim 2, wherein the fixture comprises a frame configured to receive the end effector in the predetermined orientation at times when the end effector is attached to the robot arm, and the body of the end effector is configured for mating with the frame of the fixture.

5. The system of claim 4, wherein the body has a plurality of spaced vertically extending grooves and the frame has a plurality of spaced vertically extending members for slidably mating with the grooves.

6. The system of claim 4, wherein the restraining means comprises a holding member pivotably mounted on the frame and movable between one position corresponding to the first condition of the restraining means and another position corresponding to the second condition of the restraining means, and the actuation means comprises a hydraulic cylinder and rod assembly connected to the frame, the assembly being linearly operable to extend the rod between inner and outer positions and a lever pivotably mounted to the frame for moving the socket member to the first and second conditions and the holding member to the positions corresponding to the first and second conditions in response to the extension of the rod between the inner and outer positions.

7. The system of claim 2, wherein the connecting means further comprises a pin extending from the body and spaced from the nipple of the end effector and a seizing mechanism extending from the robot arm and spaced from the socket member of the arm, the seizing member being operative for seizing the pin to fixedly attach the end effector to the arm and for releasing the pin to detach the arm from the end effector.

8. The system of claim 7, wherein the seizing mechanism includes a cavity for slidably receiving the pin, a flexible sleeve in the cavity for surrounding the pin and a plenum surrounding the sleeve for containing fluid, and the arm further comprises hydraulic means for transmitting fluid to the plenum to urge the sleeve into seizing engagement with the pin and for releasing the pressure to release the pin.

9. The system of claim 8, further comprising control means for controlling the hydraulic means of the arm to release the pin and operating the connecting means and the restraining means to their respective first conditions to detach the robot arm from the end effector with the end effector remaining in the predetermined orientation on the fixture.

10. The system of claim 9, wherein the control means further comprises means for controlling the hydraulic means of the arm to seize the pin and operating the connecting means and the restraining means to their respective second conditions to attach the robot arm to the end effector, and for operating the restraining means to the second condition to permit the removal by the arm of the end effector from the fixture.

11. A robot end effector exchange system, comprising:
    a movable robot arm;
    an end effector including a body and a tool mechanism carried by the body;
    hydraulic means in the body for operating the tool mechanism;
    a pin extending from the end effector body and a seizing mechanism extending from the robot arm, the seizing mechanism being operative for seizing the pin to fixedly attach the end effector to the arm and for releasing the pin to detach the arm from the end effector;
    a socket member extending from the robot arm and a nipple member extending from the end effector, the socket member being operable to a first condition to engage the nipple member to form a fluid tight coupling between the arm and the tool mechanism and operable to a second condition to disengage from the nipple member for permitting the detachment of the robot arm from the end effector;
    a fixture for supportably receiving the end effector in a predetermined orientation at times when the end effector is attached to the robot arm;
    a holding member pivotably mounted on the frame and movable between one position corresponding to a first condition for holding the end effector in the predetermined orientation on the fixture at times when the socket member is operated to either the first or second condition and another position corresponding to a second condition for permitting the removal by the arm of the end effector from the frame;

a hydraulic cylinder and rod assembly connected to the frame with the assembly being linearly operable to extend the rod between inner and outer positions; and a lever pivotably mounted to the frame for moving the socket member to the first and second conditions and for moving the holding member to the positions corresponding to the first and second conditions in response to the extension of the rod between the inner and outer conditions.

12. A robot end effector storage and retrieval apparatus for use with a movable robot arm releasably connected to the end effector, the robot arm and end effector each including connecting means operable to a first condition for permitting the detachment of the robot arm from the end effector and operable to a second condition for attaching the end effector to the robot arm, the apparatus comprising:

a fixture for supportably receiving the end effector in a predetermined orientation at times when the end effector is attached to the robot arm;

restraining means on the fixture operable to a first condition for holding the end effector in the predetermined orientation on the fixture at times when the connecting means is operated to either the first and second condition and operable to a second condition for permitting the removal by the arm of the end effector from the fixture; and actuation means on the fixture for selectively operating the connecting means and the restraining means to the first and second conditions.

13. The apparatus of claim 12, wherein the fixture comprises a frame configured to receive the end effector in the predetermined orientation, and the body of the end effector is configured for mating with the frame of the fixture.

14. The apparatus of claim 13, wherein the restraining means comprises a holding member pivotably mounted on the frame and movable between one position corresponding to the first condition of the restraining means and another position corresponding to the second condition of the restraining means, and the actuation means comprises a hydraulic cylinder and rod assembly connected to the frame and being linearly operable to extend the rod between inner and outer positions and a lever pivotably mounted to the frame for moving the connecting means to the first and second conditions and the holding member to the positions corresponding to the first and second conditions in response to the extension of the rod between the inner and outer positions.

15. A robot end effector for use with a movable robot arm having a fluid coupling mechanism for transmitting hydraulic fluid and a seizing mechanism spaced from the fluid coupling mechanism for releasably connecting the end effector to the arm in an operative relationship and a support fixture having a restraining means for holding the end effector in a predetermined orientation on the fixture during attachment and detachment of the robot arm and the end effector, the end effector comprising:

a body configured for mating with the fixture in the predetermined orientation;

a tool mechanism carried by the body;

hydraulic means in the body responsive to fluid pressure for operating the tool mechanism;

first means on the body for physically engaging the coupling mechanism of the arm to form a fluid tight coupling between the arm and the hydraulic means in the body; and second means on the body spaced from the first means for physically engaging the seizing mechanism of the arm to fixedly attach the end effector to the arm.

16. The end effector of claim 15, wherein the first means comprises a nipple member extending from the body and the second means comprises a pin extending from the body, wherein the coupling mechanism comprises a socket member being operable to one condition to engage the nipple member in a fluid tight relationship and to another condition to disengage from the nipple member for permitting the detachment of the robot arm from the end effector, and wherein the seizing mechanism being operative for seizing the pin to fixedly attach the end effector to the arm and for releasing the pin to detach the arm from the end effector.

17. The end effector of claim 16, wherein the body has means for cooperating with the restraining means of the fixture to hold the end effector in the predetermined orientation.

18. The end effector of claim 17, wherein the means on the body for cooperating includes a surface for engagement with the restraining means.

* * * * *